(12) United States Patent
Newville

(10) Patent No.: US 6,192,567 B1
(45) Date of Patent: Feb. 27, 2001

(54) REPAIR SYSTEM FOR DAMAGED TRANSMISSION HOUSINGS

(76) Inventor: Robert A. Newville, 105 E. Poplar, Cameron, WI (US) 54822

( * ) Notice: Subject to any disclaimer, the term of this patent is extended or adjusted under 35 U.S.C. 154(b) by 0 days.

(21) Appl. No.: 09/416,029

(22) Filed: Oct. 12, 1999

(51) Int. Cl.[7] .................................................. B23P 6/00
(52) U.S. Cl. .................................. 29/402.11; 29/402.06; 29/898.01; 408/79; 408/80; 408/93; 408/94
(58) Field of Search ..................... 29/402.06, 402.11, 29/402.19, 282, 898.01, 898.07; 408/79, 80, 81, 82, 83, 93, 94

(56) References Cited

U.S. PATENT DOCUMENTS

| | | | |
|---|---|---|---|
| 2,682,103 | * | 6/1954 | Hamilton ............................. 29/275 |
| 2,859,456 | * | 11/1958 | Taylor ................................. 29/244 |
| 3,376,630 | * | 4/1968 | Lempka ........................... 29/402.11 |
| 3,624,884 | * | 12/1971 | Scime .................................. 29/56.5 |
| 3,736,067 | * | 5/1973 | Akins ................................... 408/79 |
| 4,017,201 | * | 4/1977 | Adams et al. ....................... 408/82 |
| 4,212,571 | * | 7/1980 | Reedy et al. ........................ 408/82 |
| 4,548,530 | * | 10/1985 | Weiblen .............................. 408/79 |
| 4,997,321 | * | 3/1991 | Adams ................................ 408/80 |
| 5,077,882 | * | 1/1992 | Adams ............................ 29/402.06 |
| 5,146,817 | * | 9/1992 | Bickle ................................ 82/1.11 |
| 5,263,237 | * | 11/1993 | Gallant et al. .................. 29/402.06 |
| 5,318,391 | * | 6/1994 | Breiner ............................. 408/103 |
| 5,435,650 | * | 7/1995 | Emig et al. .......................... 384/29 |
| 5,465,473 | * | 11/1995 | Teeslink ......................... 29/402.09 |
| 5,471,730 | * | 12/1995 | Sackett ........................... 29/402.12 |
| 5,720,749 | * | 2/1998 | Rupp ................................... 606/79 |
| 5,778,532 | * | 7/1998 | Leahy ............................. 29/888.011 |

* cited by examiner

Primary Examiner—S. Thomas Hughes
Assistant Examiner—Essama Omgba
(74) Attorney, Agent, or Firm—Ryan Kromholz & Manion, S.C.

(57) ABSTRACT

A process for repairing a defective opening in an automotive transmission housing includes the steps of (a) providing a drilling jig sized to fit closely within the servo bore chamber, the drilling jig having an alignment aperture concentric with the opening when fitted within the chamber, (b) inserting into the opening a bushing which closely fits within the opening, the bushing having a central reamer guide bore with a diameter larger than the original bore diameter, (c) inserting and rotating a reamer in the reamer guide bore thereby enlarging the diameter of the opening, (d) providing and inserting a repair bushing into the enlarged opening, the repair bushing having a central opening with a diameter equal to the original diameter and having an external diameter equal to the diameter of the enlarged reamed opening. An adhesive may be used to fix the repar bushing in the opening. In the preferred embodiment, the jig includes a threaded bore laterally displaced from the alignment aperture wherein a set screw is threaded, the bushing having a shoulder which is provided with an indentation on its perimeter engaging the set screw whereby rotation of the guide during the reaming step is prevented. Two reaming steps may be performed using progressively reamers and reaming guides.

4 Claims, 2 Drawing Sheets

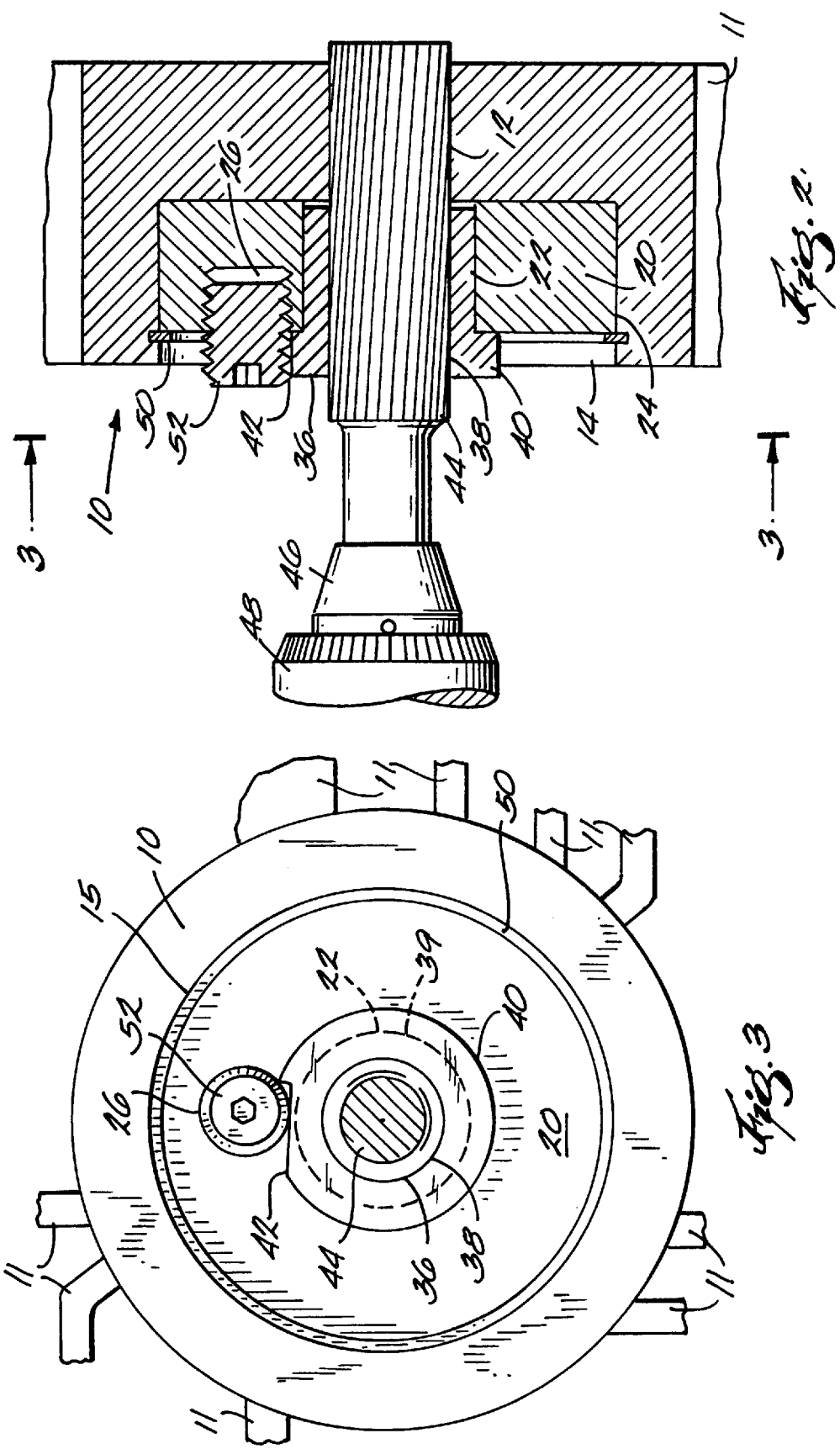

REPAIR SYSTEM FOR DAMAGED TRANSMISSION HOUSINGS

BACKGROUND OF THE INVENTION

The invention relates to a repair kit and process for repairing damaged transmission housings. More particularly, the system of this invention enables reuse of a damaged housing which would otherwise have to be discarded due to a bore which has become enlarged or worn to the point that the housing is no longer serviceable or repairable by conventional means.

Automotive automatic transmissions conventionally contain a number of moving parts and pins which must be precisely fitted to other transmission components, often through a precisely positioned and dimensioned bore or other cooperating or connecting devices.

Various repair methods for repairing worn housings have heretofore been proposed. However, none of the methods have been successful in actual practice. For example, a worn part could be welded and a new bore drilled therethrough. However, this procedure has not proved to be practical due to the impossibility of correctly aligning the tools for redrilling, particularly, utilizing the tools present in the typical automotive repair shop.

In view of these limitations a need has existed for an improved system for repairing automotive transmission housings.

SUMMARY OF THE INVENTION

It is a principal object of this invention to provide an improved system including apparatus and processes for repair of worn bores or apertures in transmission housing cases. It is a related object to provide such a system which enables repair of such housings, which previously had to be discarded, the repair being accomplished in a typical automotive repair shop using commonly available tools.

In accordance with an important aspect of the invention, a drilling jig is provided which closely fits within a chamber, such as a servo bore, of a transmission housing. In accordance with a related aspect, the drilling jig has an opening that enables accurate placement of drilling guides. In accordance with a further related aspect, the drilling guides are accurately positioned in alignment with the worn aperture to be repaired, with respect to both position and angular alignment thereof. In accordance with a further aspect, the drilling guides are provided in increments as to diameter of a guide bore contained therein so that the opening can be gradually and precisely enlarged using reamers instead of drilling devices. In accordance with a still further aspect, the bushings are held in place by the drilling jig, which is provided with a further mechanical fastener that prevents rotation of the drilling guide bushings when a reamer is being rotated therein.

In accordance with a still further aspect of the invention, a replacement bushing is provided which contains a new aperture precisely sized to replace the worn aperture and which tightly fits within an enlarged, reamed diameter of the original opening. The replaced aperture is axially in precise alignment with the original axis of the opening. In accordance with a still further related aspect, the replacement or repair bushing is tightly fitted within and adhered within the enlarged aperture utilizing suitable adhesives.

Briefly, the invention provides a process for repairing a defective opening in an automotive transmission housing includes the steps of (a) providing a drilling jig sized to fit closely within the servo bore chamber, the drilling jig having an alignment aperture concentric with the opening when fitted within the chamber, (b) inserting into the opening a bushing which closely fits within the opening, the bushing having a central reamer guide bore with a diameter larger than the original bore diameter, (c) inserting and rotating a reamer in the reamer guide bore thereby enlarging the diameter of the opening, (d) providing and inserting a repair bushing into the enlarged opening, the repair bushing having a central opening with a diameter equal to the original diameter and having an external diameter equal to the diameter of the enlarged reamed opening. An adhesive may be used to fix the repair bushing in the opening. In the preferred embodiment, the jig includes a threaded bore laterally displaced from the alignment aperture wherein a set screw is threaded, the bushing having a shoulder which is provided with an indentation on its perimeter engaging the set screw whereby rotation of the guide during the reaming step is prevented. Two reaming steps may be performed using progressively reamers and reaming guides.

Further objects and advantages of the invention will be apparent from the accompanying claims, the following detailed description and the accompanying drawings.

BRIEF DESCRIPTION OF THE DRAWINGS

FIG. 2 is a central cross sectional view of the apparatus showing a drilling jig and reaming guide inserted in a servo bore of an automatic transmission housing illustrating the housing with components broken away;

FIG. 3 is a top view of the assembly of FIG. 2 taken along the line 3—3; and

DETAILED DESCRIPTION OF THE INVENTION

Referring more particularly to the drawings a transmission housing component 10 is shown with various interconnected components 11 broken away. These components 11 generally are internal dividing walls within the transmission assembly.

Figure 1:
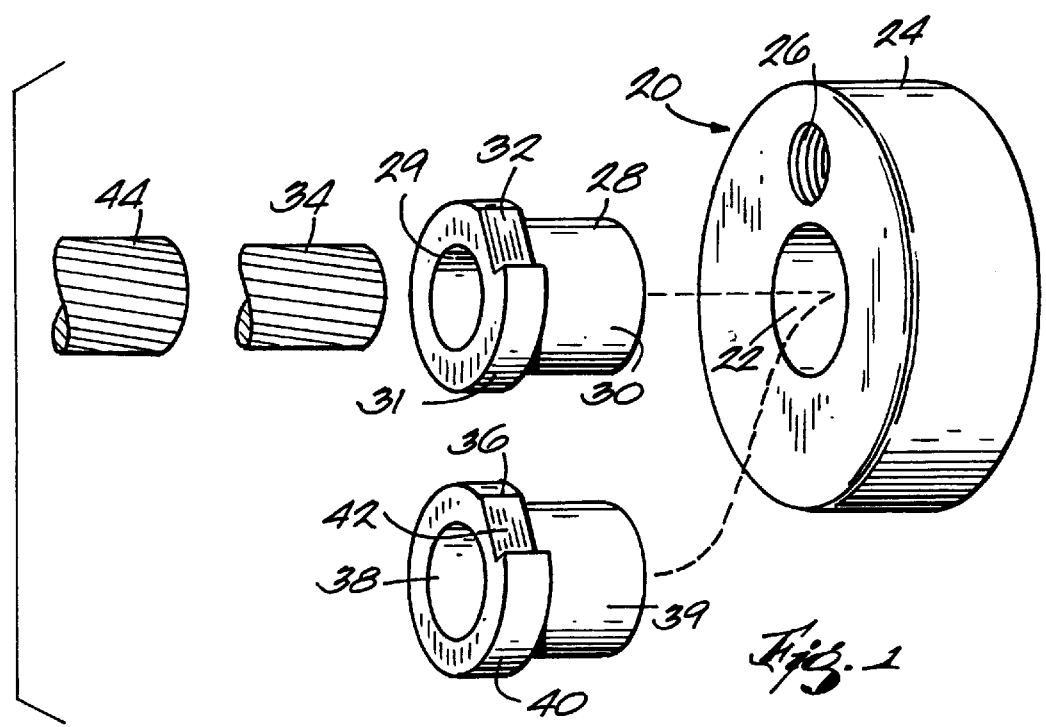
FIG. 1 is a perspective view of components of the apparatus of this invention shown in separated relationship for clarity and with dotted lines indicating the alternative insertion into a drilling rig of reaming guide bushings.

A drilling jig 20 seen most clearly in FIG. 1 has an external cylindrical surface 24 which is adapted to closely fit within the circular walls 15 of a chamber 14, such as a servo bore, in transmission housing 10.

Also, as seen in FIG. 1, drilling jig 20 has a central aperture 22 and an offset tapped, threaded opening 26 which is provided with internal threads.

A first reaming guide 28, provided with a reaming guide aperture 29, is provided with a lower cylindrical surface 30 adapted to closely fit within aperture 22. A head portion 31 of greater diameter than the stem 30 is provided to limit the distance within opening 22 that the reamer guide 28 can extend. Head portion 31 is provided with a notch 32 on one side. Notch 32 is sized to permit insertion of a set screw 52 into opening 26, thereby preventing rotation of reamer guide 28 during the reaming step. Opening 29 of reamer guide 28 is adapted to closely receive and accurately guide the rotation of a first reamer 34. In typical installation reamer 34 and guide aperture 29 are both 9/16 inch in diameter.

A second reamer guide 36, provided with an aperture 38 of a larger diameter, for example ⅝ inch, is also provided. Head portion 40 is dimensionally similar to head portion 31 of guide 28 and has a notch 42 identical to notch 32 of guide 28. A second reamer 44, of a diameter equal to that of aperture 38 of reamer guide 36, is adapted to be accurately guided during rotation by the aperture 38.

Referring again to FIGS. 2 and 3, the drilling jig 20, after insertion into cylindrical opening 24, can be held in place by a snap ring 50 which is adapted to fit into a groove in the outer wall of cylindrical opening 24 as shown in FIG. 2.

In FIGS. 2 and 3 the larger reamer guide 36 is shown to be installed in drilling jig 20. However, reaming guide 28 is installed for use in identical fashion within the drilling jig 20. After the reamer guide 36 is placed within the central opening 22 of drilling jig 20, the notch 42 is rotated to the orientation illustrated in FIG. 3 and a set screw 52 is installed in the threaded opening 26. Set screw 52 prevents rotation of the reaming guide 36 when reamer 44 is rotated therein. Also, as seen in FIG. 2 the reamer 44 is held within a chuck 46 of a rotary drill 48 or similar rotary power device.

In practice, the drill jig 20 is installed in the opening 15 of the chamber 14, usually a servo bore, of housing 10. The reaming guide 28 with the smaller opening 29 is first installed in the drilling jig 20. The opening 12 is then reamed by reamer 34 to a diameter equal to that of guide aperture 29. Reaming guide 28 is then removed from the drilling jig 20 and reaming guide 36 is installed in its place. The opening 12 is then reamed using larger reamer 44 to the selected diameter of the reamer 44. During reaming, preferably a lubricant such as automatic transmission fluid is utilized.

Figure 4:
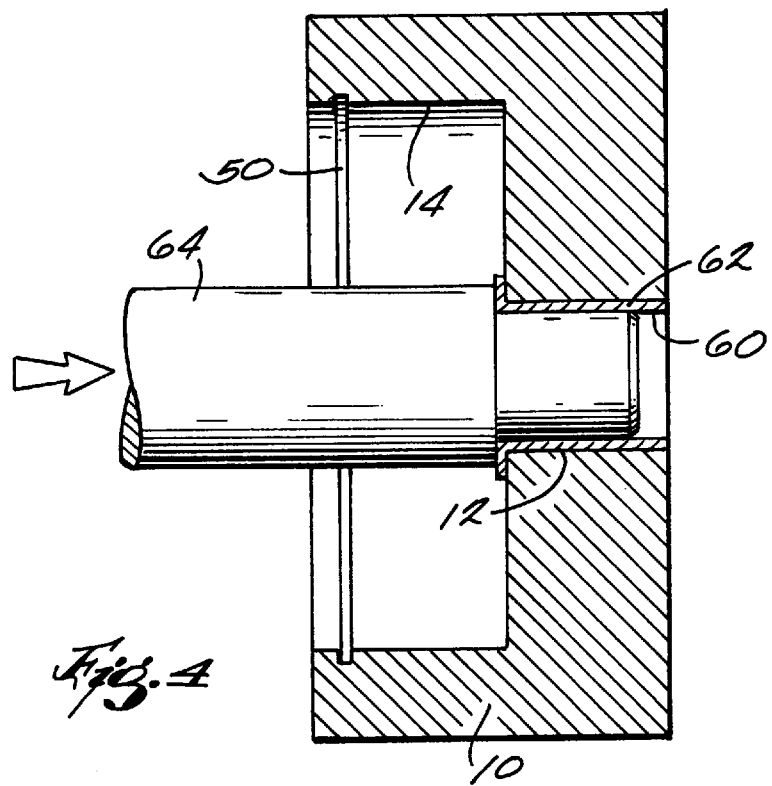
FIG. 4 is a central cross sectional view of a transmission housing component showing insertion therein of a replacement bushing.

After reaming of the opening 12 to the enlarged diameter, a replacement bushing 60, provided with an inner diameter 62, is installed as seen in FIG. 4. Opening 62 has a diameter equal to that of the original aperture 12 in the transmission case. Preferably the replacement bushing 60 is coated on its exterior surfaces with a suitable adhesive of a type commonly used to lock nuts and bolts together. Typically such adhesives are of a cyanoacrylate type, for example, those sold under the tradename Locktite®.

While preferred embodiments of the invention have been shown for purposes of illustration it will be apparent to those skilled in the art that various modifications within the scope of the invention can be made.

What is claimed is:

1. A process for repairing a defective opening in an automotive transmission housing wherein said opening has a first diameter and is located through a wall of a chamber in said housing comprising:

providing a drilling jig sized to fit closely within said chamber, said drilling jig having an alignment aperture concentric with said opening when fitted within said chamber, providing and inserting into said alignment aperture a first bushing which closely fits within said alignment aperture, said bushing having a central reamer guide bore with a second diameter larger than said first diameter, fixing said bushing in said drilling jig to prevent rotation of said bushing relative to said jig, inserting and rotating a reamer in said reamer guide bore thereby enlarging the diameter of said opening to said second diameter, removing said reamer and said first bushing from said jig, inserting into said alignment aperture a second bushing which closely fits within said alignment aperture, said bushing having a central reamer guide bore with a third diameter larger than said second diameter, fixing said second bushing in drilling jig to prevent rotation of said second bushing relative to said jig, inserting and rotating a second reamer in the reamer guide bore of said second bushing to further enlarge said opening to said third diameter, removing said reamer and said second bushing from said jig, providing and inserting a repair bushing into said enlarged opening, said repair bushing having a central opening therethrough with a diameter equal to said first diameter and having an external diameter equal to said third diameter.

2. The process according to claim 1 further comprising the step of applying an adhesive to the exterior of said repair bushing and curing said adhesive after insertion of said bushing into said enlarged opening.

3. The process according to claim 1 wherein said jig comprises a threaded bore laterally displaced from said alignment aperture and wherein a set screw is threaded into said threaded bore after installation of said jig in said chamber, said bushing having a shoulder which is provided with an indentation on its perimeter, said indentation engaging said set screw whereby rotation of said guide during said reaming step is prevented.

4. The process according to claim 1 wherein said chamber comprises a servo bore.

* * * * *